Patented Oct. 10, 1944

2,359,772

UNITED STATES PATENT OFFICE 2,359,772

HALOSTEROIDS AND PREPARATION OF THE SAME

Russell Earl Marker, State College, Pa., and Harry M. Crooks, Jr., Detroit, Mich., assignors to Parke, Davis & Company, Detroit, Mich., a corporation of Michigan No Drawing. Original application September 4, 1941, Serial No. 409,590. Divided and this application September 14, 1942, Serial No. 458,332

20 Claims. (Cl. 260—397.4)

The invention relates to the preparation of steroid compounds useful as intermediates in the preparation of certain hormones.

The present application relates to the conversion of 17,21-dihalo-20-keto steroids, first into $\Delta^{16}$-21-halo-20-keto steroids and then into 21-halo-20-keto steroids. The 21-halo-$\Delta^{16}$-unsaturated 20-keto pregnane compounds are a new class of compounds particularly useful for the preparation of substances of the cortical hormone type.

This application is a division of our copending application, Serial No. 409,590, filed September 4, 1941. In said copending application the preparation of 17,21-dihalo steroids is described and claimed.

These compounds have in ring D the following formula

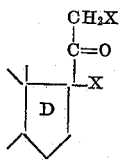

where X is chlorine or bromine. Rings A, B and C may be unsubstituted or may bear substituents such as —OH, —O—acyl and —Hal, and, furthermore, may have one or more points of unsaturation such, for example, as a double bond at $\Delta^5$. Regardless of these particular features in rings A, B and C, the transformation in ring D proceeds according to the following diagram:

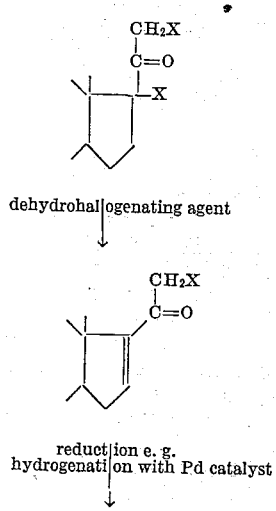

Dehydrohalogenating agents suitable for the first step in the above diagram include the combination of an organic carboxylic acid and an alkali metal salt of an organic carboxylic acid, also a tertiary amine base. Potassium acetate and acetic acid, sodium acetate in acetic acid and also pyridine are particularly satisfactory dehydrohalogenating agents, but other substances may be used such as sodium benzoate in valeric acid, dimethyl aniline, quinoline, triethanolamine.

The 21-acyloxy compounds and the 21-hydroxy compounds illustrated in the above diagram are valuable intermediates for the preparation of substances having cortical hormone activity. The invention may be further illustrated by the following examples:

Example 1

A. *17,21-dibromo-pregnanol-3-($\beta$)-one-20 acetate.*—A solution of 5 g. of pregnanol-3-($\beta$)-one-20 acetate in 150 cc. of glacial acetic acid containing 2 drops of 48% hydrobromic acid is warmed to 40° C. and then 29 cc. of 1 M. bromine in acetic acid is added dropwise. After the solution has stood for fifteen minutes it is poured into water and the precipitated solid collected and washed with water. The solid is recrystallized from acetone to give white crystals of 17,21-dibromo-pregnanol-3-(β)-one-20 acetate of M. P. 190–191° C.

Anal. Calcd. for $C_{23}H_{34}O_3Br_2$: C, 53.3; H, 6.6. Found: C, 52.9; H, 6.7.

B. *$\Delta^{16}$ - 21-bromo-pregnenol-3-(β)-one-20 acetate.*—A solution of 5 g. of 17,21-dibromo-pregnanol-3-(β)-one-20 acetate and 5 g. of fused potassium acetate in 800 cc. of glacial acetic acid is refluxed for ninety minutes. Then the reaction mixture is concentrated in vacuo to a volume of 100 cc., diluted with water and the precipitated solid taken up in ether. The ethereal extract is washed with 5% sodium bicarbonate solution and with water and then the ether is removed on a steam bath. The residue is fractionally crystallized from methanol. There is obtained first an appreciable amount of unreacted starting material, 17,21-dibromo-pregnanol-3-(β)-one-20 acetate, M. P. 190–191° C. Further concentration of the mother liquors, however, yields the desired product, 21 - bromo - $\Delta^{16}$-pregnenol-3-(β)-one-20 acetate, as white plates of M. P. 151–154° C.

Anal. Calcd. for $C_{23}H_{33}O_3Br$: C, 63.1; H, 7.6. Found: C, 63.3; H, 7.8.

C. *21-bromo-p r e g n a n o l-3-(β)-one-20 acetate.*—A solution of 1 g. of 21-bromo-$\Delta^{16}$-pregnenol-3-(β)-one-20 acetate in 100 cc. of dioxane is shaken with 2 g. of palladium-barium sulfate catalyst and hydrogen at 3 atmospheres pressure at room temperature for two hours. Then the mixture is filtered and the filtrate concentrated in vacuo. The residue is crystallized from methanol to give fine white needles of 21-bromo- pregnanol-3-(β)-one-20 acetate, M. P. 145–147° C.

D. *Reaction of 21-bromo-pregnanol-3-(β)-one-20 acetate with potassium acetate.*—A solution of 0.8 g. of 21-bromo-pregnanol-3-(β)-one-20 acetate and 1 g. of fused potassium acetate in 100 cc. of glacial acetic acid is refluxed for three hours. Then the solution is concentrated in vacuo and poured into water. The precipitated solid is taken up in ether, the ethereal extract washed well with water and then the ether is evaporated on a steam bath. The residue is crystallized from methanol to give pregnanediol-3-(β),21-one-20 diacetate of M. P. 145–146° C.

*Example 2*

A. *17,21-dibromo-pregnanol-3-(β)-one-20.*—To a solution of 10 g. of pregnanol-3-(β)-one-20 in 300 cc. of glacial acetic acid at 40° C. is added several drops of 48% hydrobromic acid. Then 62.6 cc. of 1 M. bromine in acetic acid is added dropwise. After the addition of bromine is completed, the solution is poured into water and the precipitated solid collected and washed with water. The solid is crystallized from ether to give thick white needles of 17,21-dibromo-pregnanol-3-(β)-one-20 of M. P. 190–192° C.

On treatment with iron and acetic acid, 17,21 dibromo-pregnanol-3-(β)-one-20 yields pregnanol-3-(β)-one-20.

B. *21-b r o m o-$\Delta^{16}$-pregnenol-3-(β)-one-20.*—A solution of 2 g. of 17,21-dibromo-pregnanol-3-(β)-one-20 and 2 g. of fused potassium acetate in 300 cc. of glacial acetic acid is refluxed for two hours. The solution is concentrated in vacuo, diluted with water and the precipitated solid taken up in ether. The ethereal extract is washed well with water, the ether evaporated and the residue crystallized from methanol to give 21-bromo-$\Delta^{16}$-pregnenol-3-(β)-one-20 as white crystals of M. P. 155–157° C.

C. *21-bromo-pregnanol-3-(β)-one-20.*—A solution of 2 g. of 21-bromo-$\Delta^{16}$-pregnenol-3-(β)-one-20 in 125 cc. of dioxane is shaken with 4 g. of palladium barium sulfate catalyst and hydrogen at 3 atmospheres pressure at room temperature for two hours. Then the mixture is filtered and the filtrate evaporated to dryness in vacuo. The residue is crystallized from methanol to give white crystals of 21-bromo-pregnanol-3-(β)-one-20, M. P. 127–128° C.

D. *Reaction of 21-bromo-pregnanol-3-(β)-one-20 with potassium acetate.*—A mixture of 0.9 g. of 21-bromo-pregnanol-3-(β)-one-20, 3 g. of fused potassium acetate and 10 cc. of glacial acetic acid is refluxed for three and one-half hours. Then the reaction mixture is diluted with water and the precipitated solid taken up in ether. The ethereal extract is washed with water, decolorized by treatment with Norite and the ether evaporated on the steam bath. The residue is crystallized from ether to give pregnanediol-3-(β), 21-one-20 21-monoacetate, M. P. 121–123° C.

From the above examples it will be noted that this invention is particularly useful for converting a 17,21-dihalo-pregnanol-3-one-20 or an ester thereof into a 21-halo-pregnanol-3-one-20 or an ester thereof which in turn may be converted into 21-hydroxy pregnanol-3-one-20 compounds or the 21-acyloxy derivatives thereof. It is to be understood that the ester groups at C₃ and C₂₁ need not necessarily be acetate but may be any ester group capable of hydrolysis to a hydroxyl group.

What we claim as our invention is:

1. Process for preparing a $\Delta^{16}$-21-halo-20-keto pregnene which comprises reacting a 17,21-dihalo-20-keto pregnane with a dehydrohalogenating agent of the class consisting of tertiary amine bases and combinations of an organic carboxylic acid and an alkali metal salt of an organic carboxylic acid.

2. Process for preparing a $\Delta^{16}$-21-halo-20-keto pregnene which comprises reacting a 17,21-dihalo-20-keto pregnane with the combination of an organic carboxylic acid and an alkali metal salt of an organic carboxylic acid.

3. Process for preparing a $\Delta^{16}$-21-halo-pregnenol-3-one-20 which comprises reacting a 17,21-dihalo-pregnanol-3-one-20 with the combination of an organic carboxylic acid and an alkali metal salt of an organic carboxylic acid.

4. Process for preparing a carboxylic acid ester of a $\Delta^{16}$-21-halo-pregnenol-3-one-20 which comprises reacting a carboxylic acid ester of a 17,21-dihalo-pregnanol-3-one-20 with the combination of an organic carboxylic acid and an alkali metal salt of an organic carboxylic acid.

5. Process for preparing $\Delta^{16}$-21-bromo-pregnenol-3-β-one-20 acetate which comprises reacting 17,21-dibromo-pregnanol-3-β-one-20 acetate with the combination of an organic carboxylic acid and an alkali metal salt of an organic carboxylic acid.

6. Process for preparing steroid intermediate compounds which comprises reacting a 17,21-dihalo-20-keto pregnane with the combination of an organic carboxylic acid and an alkali metal salt of an organic carboxylic acid thereby producing a $\Delta^{16}$-21-halo-20-keto pregnene and reducing the latter to obtain a 21-halo-20-keto pregnane.

7. Process for preparing steroid intermediate compounds which comprises reacting a 17,21-dihalo-20-keto pregnane with the combination of an organic carboxylic acid and an alkali metal salt of an organic carboxylic acid thereby producing a $\Delta^{16}$-21-halo-20-keto pregnene and catalytically hydrogenating the latter in the presence of a palladium catalyst to obtain a 21-halo-20-keto pregnane.

8. Process for preparing a steroid intermediate compound which comprises reacting a steroidal compound having at ring D the formula

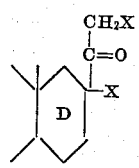

where X is a member of the class consisting of chlorine and bromine with the combination of an organic carboxylic acid and an alkali metal salt of an organic carboxylic acid thereby producing a steroidal compound having in ring D the structure

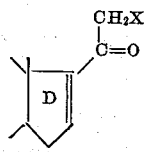

9. Process for preparing a steroid intermediate compound which comprises reacting a steroidal compound having at ring D the formula

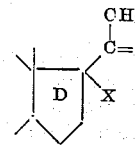

where X is a member of the class consisting of chlorine and bromine with the combination of an organic carboxylic acid and an alkali metal salt of an organic carboxylic acid thereby producing a steroidal compound having in ring D the structure

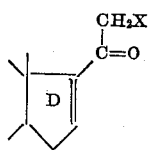

and reducing the latter to obtain a steroid having in ring D the structure

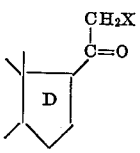

10. Process according to claim 9 in which the reduction is catalytic hydrogenation in the presence of a palladium catalyst.

11. Process for preparing a steroid intermediate compound which comprises reacting the compound having the following structural formula

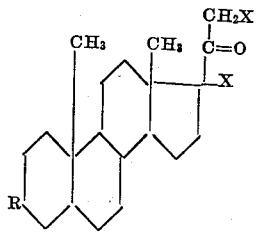

where X is a member of the class consisting of chlorine and bromine and R is a member of the class consisting of —OH and groups hydrolyzable to —OH with the combination of an organic carboxylic acid and an alkali metal salt of an organic carboxylic acid thereby producing a compound having the following formula

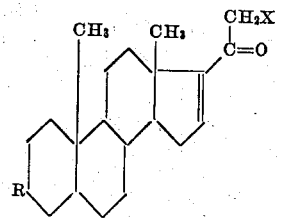

12. Process for preparing a steroid intermediate compound which comprises reacting the compound having the following structural formula

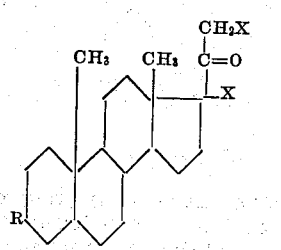

where X is a member of the class consisting of chlorine and bromine and R is a member of the class consisting of —OH and groups hydrolyzable to —OH with the combination of an organic carboxylic acid and an alkali metal salt of an organic carboxylic acid thereby producing a compound having the following formula

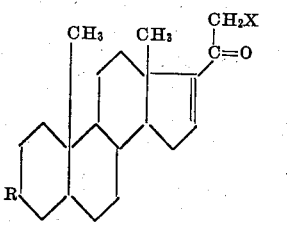

and reducing the latter compound to obtain a compound having the following formula

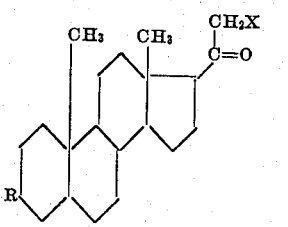

13. Process according to claim 12 in which the reduction for catalytic hydrogenation in the presence of a palladium catalyst.

14. Process for obtaining an intermediate for a compound having cortical hormone activity which comprises reacting a compound having the formula

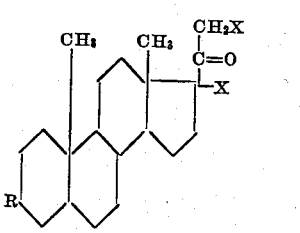

where X is a member of the class consisting of chlorine and bromine and R is a member of the class consisting of —OH and groups hydrolyzable to —OH, with the combination of an organic carboxylic acid and an alkali metal salt of an organic carboxylic acid thereby producing a compound having the formula

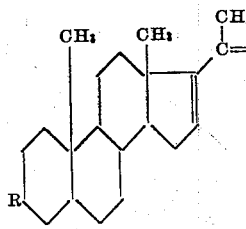

reducing the latter to obtain a compound having the formula

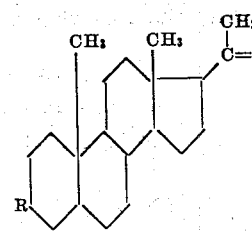

and exchanging an acyl oxy group of an organic carboxylic acid for the halogen the last mentioned compound thereby producing a compound having the formula

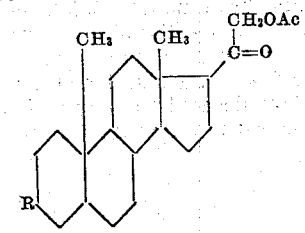

15. Process according to claim 14 in which the reduction is catalytic hydrogenation in the presence of a palladium catalyst.

16. A steroidal compound having in ring D the following structure where X is a member of the class consisting of bromine and chlorine.

17. A steroidal compound having the formula where X is a member of the class consisting of chlorine and bromine and R is a member of the class consisting of —OH and groups hydrolyzable to —OH.

18. A carboxylic acid ester of a $\Delta^{16}$-21-halo-pregnenol-3-one-20.

19. $\Delta^{16}$ - 21 - bromo-pregnenol-3-$\beta$-one-20 acetate having a melting point about 190–191° C.

20. 21-bromo-$\Delta^{16}$-pregnenol-3-$\beta$-one-20 having a melting point about 155–157° C.

RUSSELL EARL MARKER.
HARRY M. CROOKS, Jr.